United States Patent
Beattie

[11] Patent Number: 6,046,431
[45] Date of Patent: Apr. 4, 2000

[54] REMOTE OPERATOR VIEWING AND MEASUREMENT SYSTEM FOR ARC WELDING

[76] Inventor: Robert John Beattie, 47 Stewartfield Drive, East Kilbride G74 4UA, United Kingdom

[21] Appl. No.: 09/063,490

[22] Filed: Apr. 20, 1998

[30] Foreign Application Priority Data

Apr. 19, 1997 [GB] United Kingdom .................... 9707954

[51] Int. Cl.[7] .................................................. B23K 9/127
[52] U.S. Cl. ........................................................ 219/124.34
[58] Field of Search ..................... 219/130.01, 124.34, 219/124.1, 125.1, 125.11; 901/42

[56] References Cited

U.S. PATENT DOCUMENTS

| | | | |
|---|---|---|---|
| 3,532,807 | 10/1970 | Webb ................................. | 219/124.34 |
| 4,021,840 | 5/1977 | Ellsworth et al. ................... | 219/124.1 |
| 4,144,992 | 3/1979 | Omae et al. ........................ | 219/125.11 |
| 4,491,719 | 1/1985 | Corby, Jr. ........................... | 219/124.34 |
| 4,859,829 | 8/1989 | Dufour ................................. | 19/130.01 |
| 4,922,174 | 5/1990 | Pietrzak et al. ..................... | 219/124.34 |
| 5,371,339 | 12/1994 | Dillet et al. ......................... | 219/124.34 |

FOREIGN PATENT DOCUMENTS

| | | |
|---|---|---|
| 452138 A2 | 10/1991 | European Pat. Off. . |
| 452138 A3 | 10/1991 | European Pat. Off. . |
| 520894 A1 | 12/1992 | European Pat. Off. . |

*Primary Examiner*—Clifford C. Shaw
*Attorney, Agent, or Firm*—Ratner & Prestia

[57] ABSTRACT

Arc welding control apparatus includes a laser (10) for projecting a first reference mark (24) along a first axis onto the line of a weld (26) and a video camera (12) arranged to view the work piece along a second axis to generate a video image including the first reference mark. The apparatus is mounted on a welding torch for movement therewith, the first and second axes intersecting at a predetermined point relative to the video camera. Sensor control means (30) receives the video signal from the video camera, and generates a composite video signal representing the original image with an image of a second mark superimposed therein. The position of the second mark is adjustable within the image frame. The position of the welding torch is set such that the welding electrode is positioned with the first mark projected onto the line of the weld ahead of the torch. The location of the second mark is adjusted within the image frame such that it is aligned with the first mark. During welding, the position of the second mark is monitored and the vertical and/or horizontal position of the welding torch is adjusted so as to maintain the first and second reference marks in alignment. The invention may be adapted to enable remote dimensional measurements of the workpiece.

12 Claims, 5 Drawing Sheets

REMOTE OPERATOR VIEWING AND MEASUREMENT SYSTEM FOR ARC WELDING

This invention relates to the field of arc welding. In particular to methods and apparatus for viewing the position of the welding electrode relative to the weld joint both before striking the welding arc and while welding after the arc has been struck. Further, the invention relates to the field of semi-automatic or machine welding in which the welding torch is held by part of a machine such as a column & boom machine, or a seam welder, or a welding lathe, or a side beam welder, or a travel carriage welder or a rotary welder or various other types of machine, but where the position of the welding electrode is adjusted, if necessary, by operator interaction with the machine controls. In addition, the invention may also be implemented in a manner which allows accurate measurements of the weld joint to be carried out remotely.

In this field it is already known that the position of the welding electrode relative to the weld joint is critical for production of satisfactory welds. If all of the parts to be welded are known to be identical and the tooling of the welding machine holds each part with sufficient accuracy, then the weld can be completed automatically and reliably by the welding electrode executing a fixed path over the part. However, it is often the case that the parts to be welded have inherent variability or they cannot be repeatably mounted in the welding machine. In these cases it becomes necessary for the position of the welding electrode relative to the weld joint or some of the process parameters, such as the welding travel speed, to be sensed and adjusted while the weld is in progress. This can be performed by manual means or by automatic means.

Typical manual means depend on the type of welding process being used. It is necessary to distinguish between the submerged arc process, which does not generate a bright arc, and open arc welding processes, such as the well known MIG, TIG and FCAW processes.

In submerged arc welding, the weld joint in the vicinity of the welding arc is covered by a powder flux. This means that the operator cannot see the actual weld process. This presents a problem for the operator with respect to controlling the position of the welding torch. One well known solution for controlling the lateral position of the welding torch is to position a small light source to project a beam parallel to the welding torch but slightly ahead of it in the direction of welding, such that the beam strikes the weld joint in front of the region covered by the powder flux. The operator can then monitor the position of the light on the weld joint and make the necessary adjustments to the lateral position. In this case, the operator can either monitor the beam directly or via a television camera and video monitor. To control the height of the welding electrode (stickout), the operator can simply make a rough direct visual judgement of the height and adjust the torch position accordingly, or an automatic system can be used, for example, one based on the use of proximity switches.

In open arc welding, the weld joint is not covered by solid flux and can be observed by the operator either directly through a suitably shaded filter or indirectly through a video camera and monitor.

Fully automatic systems for controlling the position of the welding electrode relative to the joint are also available, for example as disclosed in EP 0 520 894 A1, or EP 0 452 138 A2. There are several methods in common use. One method uses a tactile probe or mechanical finger which is connected to a mechanical or electronic feedback device which adjusts the position of the welding torch in response to sensed variations from a reference position. Another method projects a laser stripe or scans a laser spot across from the joint and then images the stripe or spot onto an electronic detector to determine a cross section by triangulation. The resulting image is then analyzed by hardware and software and suitable positional corrections are output to the machine controls.

These existing systems have disadvantages as follows:

In the case where the operator views the arc directly, the operator must be in close proximity to the arc. This is uncomfortable due to reasons of heat, fumes and often restricted access and position. These problems lead to operator fatigue and other problems and cause reduced production rates over those which might otherwise be achieved. In open arc welding, the operator must view the arc through a dark shaded filter. This impairs the quality of the view and makes accurate estimation of relative and absolute dimensions more difficult. In submerged arc welding, the coverage of the powder flux makes it more difficult to estimate relative and absolute positions accurately.

In the case where the operator views the arc indirectly through a video camera and monitor, there is not normally enough information in the two-dimensional video image for the operator to control the weld height accurately. In submerged arc welding, a light source such as a torch beam is often used to provide a weld reference, as mentioned above. However, this is not associated with a reference in the received image. So the operator is able to judge the lateral position of the welding torch from the position of the light relative to some visible feature of the weld joint but not the vertical position.

In open arc welding, the image is not particularly clear because the video camera must view the weld in progress through a dark shaded filter or use a very short effective exposure time. This greatly reduces the clarity of the picture because of the very large difference in brightness between the arc and the surrounding area and makes it difficult for the operator to correctly determine the position of the electrode relative to the weld joint, especially in height. Also because of the intensity of the welding arc, the use of light sources to provide reference marks to assist the operator is excluded.

Also, the use of a conventional video camera in the above mentioned cases does not provide the operator with any means of establishing dimensionally accurate measurements of the weld joint remotely.

In the case of fully automatic systems, the disadvantages of existing systems are cost, complexity and the limited applicability of the methods to the full range of welding situations. While there are welding applications which are well suited to a fully automatic joint tracking solution, there are also many applications where manual intervention is more appropriate for reasons of limited funds for new equipment or because the payback from a fully automatic system does not justify the investment or because the application is inherently unsuitable for an automatic system.

The invention, in its various aspects, is defined in the claims appended hereto.

While further modifications and improvements may be made without departing from the scope of this invention, the following is a description of two examples of the invention with reference to the accompanying drawings, in which.

Figure 1:
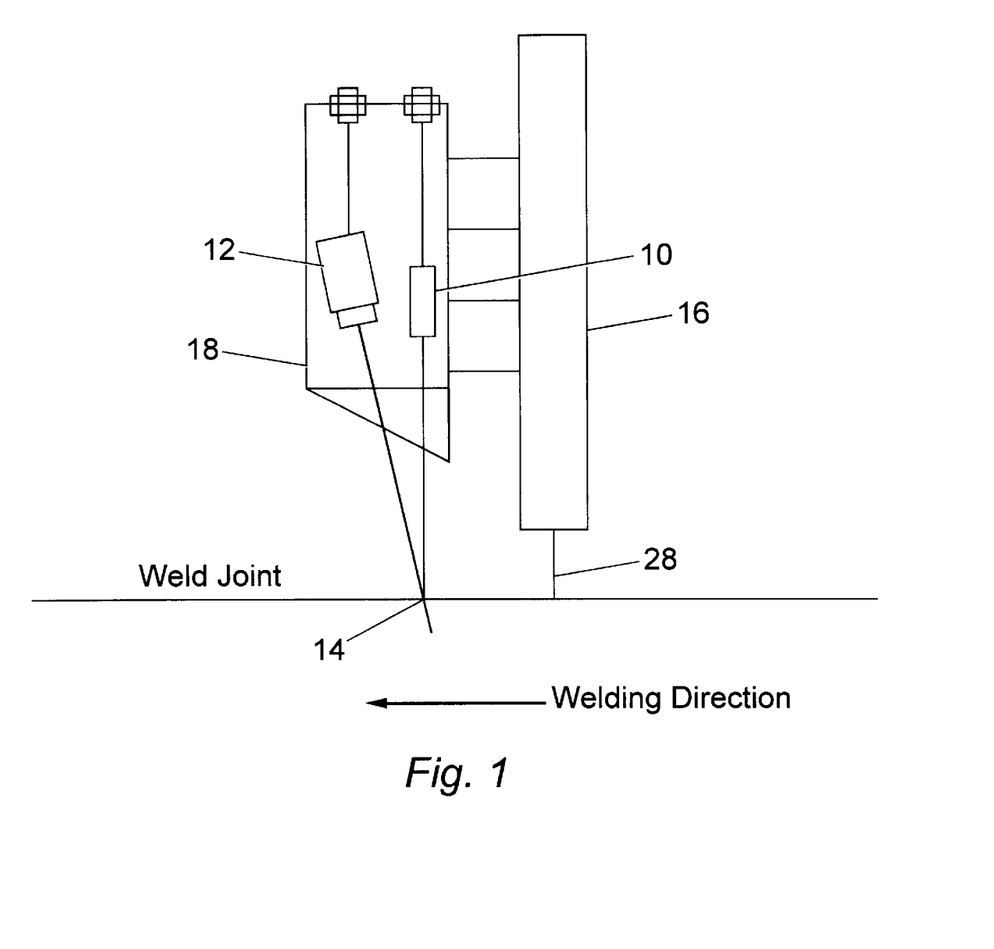
FIG. 1 is a schematic side view of a welding system adapted to include a control system embodying the present invention.

Referring now to the drawings, the simplest example of the new method applies in the case of submerged arc welding where the viewing system does not have to deal with the presence of an open arc. There are two main features in the new method and apparatus described here, which are:

1. The use of a light source (preferably a laser source) 10 and video camera 12 in a fixed relationship to each other and to the welding torch, whereby the position of the point of incidence 14 of the light source on the image of the weld joint as seen by the camera is a function of both the lateral and height relationship of the camera 12 (and hence the welding torch 16) to the weld joint. This is conveniently achieved by mounting the light source 10 and video camera 12 in a single ruggedised enclosure 18 which can itself be mounted in a fixed relationship to the welding torch as shown in FIG. 1.

2. The use of an operator adjustable reference overlay mark 20 on the video monitor 22, such that the mark 20 can be lined up with the position of the image 24 of the light source and fixed when the welding torch 16 is known to be in the correct position in height relative to the weld joint 26. When welding then starts, it is the function of the operator to observe the relationship of the position of the image 24 of the light source relative to the positions of the weld joint 26 and the reference mark 20 in the video signal. If the electrode 28 starts to move out of the weld joint 26, i.e. if a lateral position error arises, then the light source image 24 will also start to move out of the image of the weld joint 26. Accordingly, the first function of the operator is to maintain the position of the light source image 24 in the correct horizontal image position relative to the weld joint 26. This is known in the prior art. If the height of the welding torch 16 relative to the weld joint 26 starts to change, then the image 24 of the light source and that of the reference mark 20 will start to diverge vertically. Accordingly, it is the second function of the operator to maintain the height of the welding torch 16 such that the image of the reference mark 20 remains aligned with the light source image 24.

Figure 2:
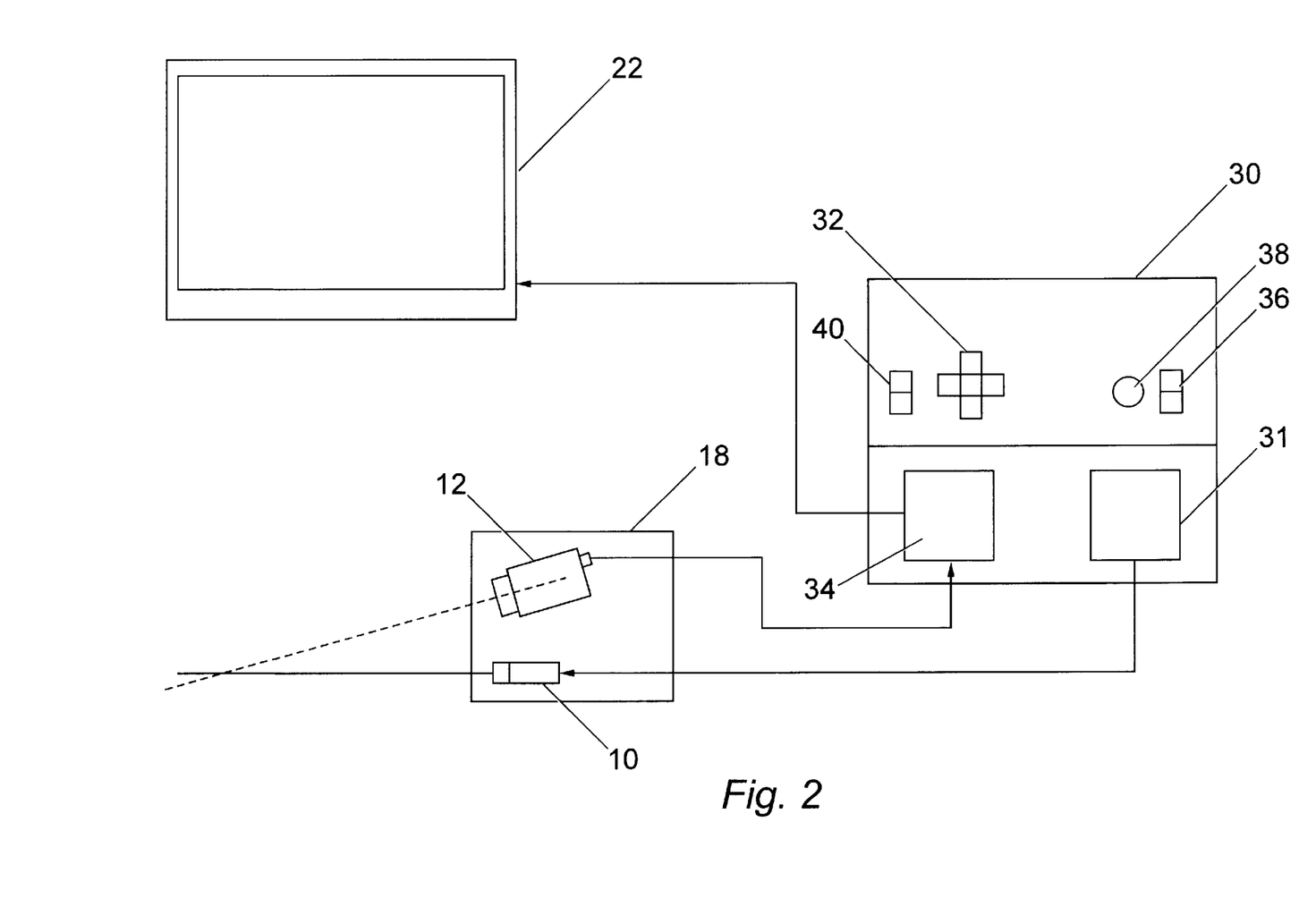
FIG. 2 is a block diagram illustrating a welding control system in accordance with the invention.

The apparatus for use with submerged arc welding is shown in FIG. 2. The three main components of the system are:

1. The ruggedised sensor unit 18 containing the light source 10 and video camera 12.

2. A sensor control unit 30 which provides power (power supply unit 31) to control the brightness of the light source 10 and which superimposes the reference mark 20 on the video signal.

3. The video monitor 22 on which the operator can observe the relationship between the light source image 24, the reference mark 20 and the weld joint 26.

The light source 10 in the sensor unit 18 is conveniently a miniature laser diode module with cross hair projection optics. This projects a visible red cross onto the weld joint. The cross is visible to the operator by the naked eye for safety purposes. The video camera 12 may be a miniature CCD unit providing the required resolution in a small package. The optical axes of the light source 10 and camera 12 are arranged to be on the same line in the welding direction, but with their angles of viewing offset by a fixed amount, typically 15–30°. This triangulation angle ensures that the position of the image 24 of the light source is a function of the height of the camera 12 above the weld joint 24 as well as its lateral position. Both the light source 10 and video camera 12 are preferably mounted in the ruggedised enclosure 18 providing suitable protection against the various hazardous influences of the welding environment.

The sensor control unit 30 performs two main functions. It provides a variable power supply to the light source 10 enabling the brightness of the light source to be adjusted for optimum operator viewing. It also provides the means whereby the operator can superimpose the visible reference mark 20 on the video signal. This may be in the form of a horizontal line or a cross hair on the image. The reference mark can be superimposed as a white line or cross, a black line or cross, or as an inverse video line or cross, where the line or cross at any point is white or black depending on the brightness of the underlying image at that point. To perform this function, the sensor control unit 30 must have an operator interface and a video processing capability. The operator interface provides a means 32, for example by the use of up, down pushbuttons, for the operator to move the reference mark 20 until it is in the correct reference position. The video processing function, suitably implemented by means of a video processing board 34, receives the video signal from the camera 12 in the sensor unit 18 and modifies the signal as necessary to overlay the reference mark 20 in the desired position.

The video signal is then displayed conveniently on a suitable video monitor 22 enabling the operator to clearly observe the position of the light source image 24 relative to the reference mark 20

Operation of the system is preceded by a setup phase. The setup phase consists of the following steps:

1. The operator adjusts the position of the welding machine until the welding electrode 28 is in the correct position, both laterally and vertically, relative to the weld joint 24 such that a good weld would be produced. The relationship between the welding torch 28 and the sensor unit 18 must be such that the sensor unit 18 is directly ahead of the welding torch 16 in the direction of welding. The welding machine is then not moved until the setup phase is complete.

2. The operator then switches on the light source (switch 36) and adjusts the brightness of the light source (control 38) and the brightness and contrast of the video monitor 22 until a clear picture is obtained of the weld joint 26 including the position of the image of the light source 24 on the weld joint 26.

3. The operator then switches on the reference mark overlay (switch 40) on the video monitor and moves the position of the reference mark 20 until it is superimposed on the image position of the light source 24. The system is now setup and ready to weld. The reference mark position 20 gives a clear datum showing where the light source image 24 should be in the video image of the weld area.

Figure 3A:
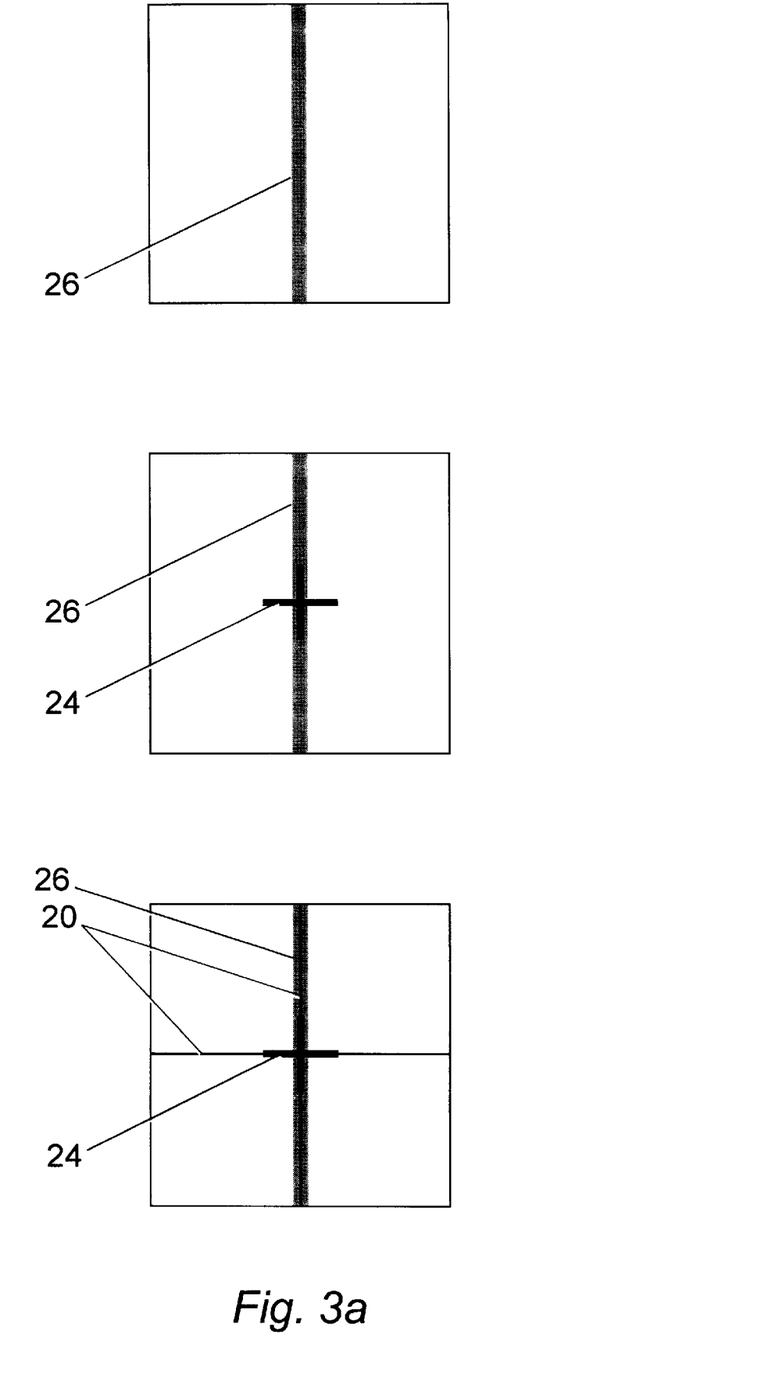
FIGS. 3(a) and 3(b) illustrate views seen on a video monitor during the setup and operation of the systems of FIGS. 1 and 2.
Figure 3B:
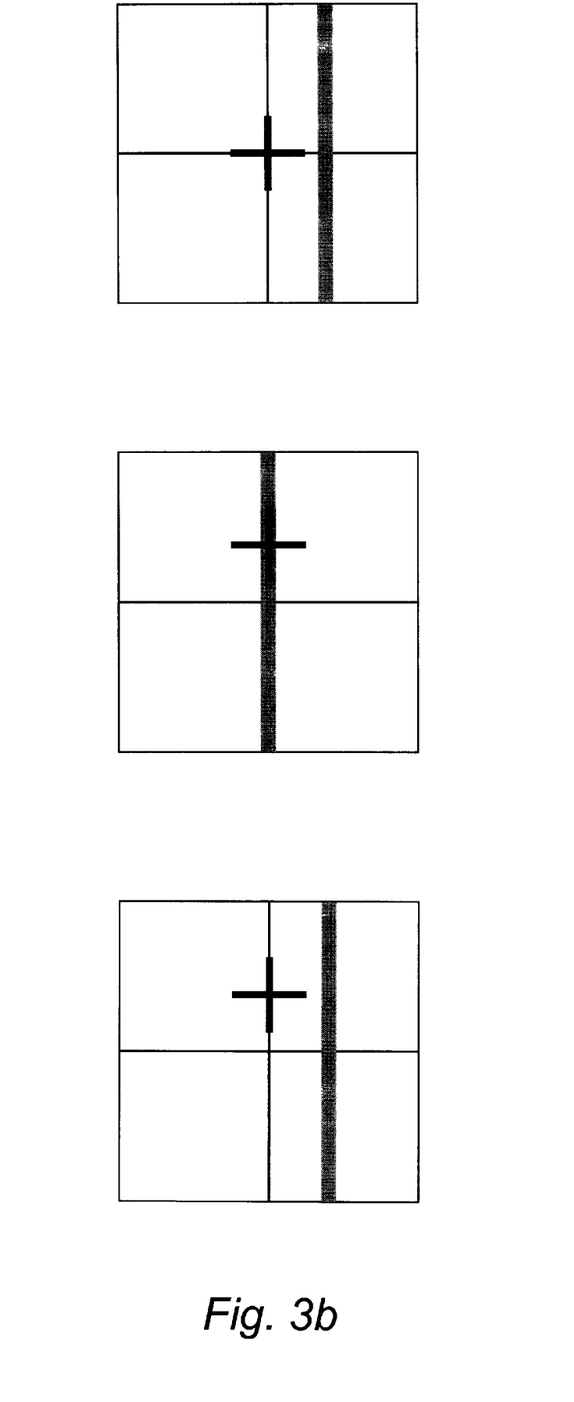

Following setup, in normal production welding, the operator must continuously monitor the video image. If the image of the light source 24 starts to move away from the reference mark 20, the operator must adjust the height of the welding position accordingly to bring the two references 20 and 24 back into alignment. If the image of the light source 24 starts to move away from the weld joint 26, the operator must adjust the lateral position of the welding torch 16 to bring the image of the light source 24 back into the correct horizontal position with respect to the weld joint 26. Graphical representations of typical video images are shown in FIG. 3.

The method as applied to open arc welding is the same in principal. However, there has to be some additional equipment to deal with the bright welding arc to ensure that the light source providing the reference on the weld joint is visible in the video image.

Figure 4:
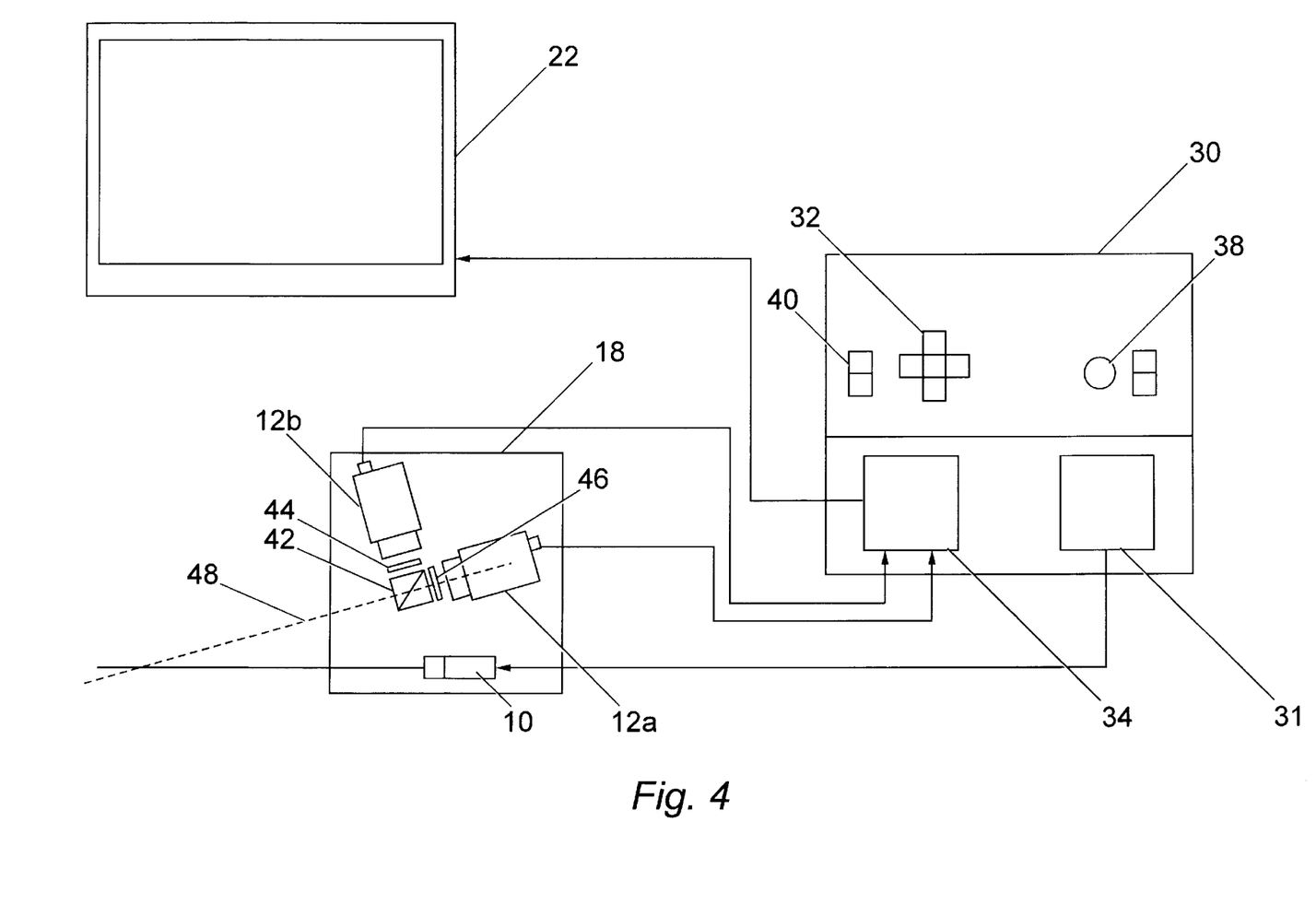
FIG. 4 is a block diagram illustrating an alternative embodiment of a welding control system in accordance with the invention.

The apparatus for use with open arc welding is shown in FIG. 4. Components common to the embodiments of FIGS. 1 and 4 are indicated by like reference numerals. The three main components of the system are:

1. The ruggedised sensor unit 18 containing the coherent light source 10, a beam splitter 42, a narrow band optical filter 44, a dark shaded welding filter 46 and two synchronised video cameras or ccd image sensors 12A and 12B.

2. The sensor control unit 30 which provides power (power supply unit 31) to control the brightness of the light source 10, which mixes the two video signals and which superimposes the reference mark 20 on the video image.

3. The video monitor 22 on which the operator can observe the relationship between the light source image 24 and the reference mark 20 and between the light source image 24 and the weld joint 26.

The light source 10 in the sensor unit 18 is, again, conveniently a miniature laser diode module with cross hair projection optics. This projects a visible red cross onto the weld joint. The temperature of the laser diode may be controlled to ensure the stability of the frequency of the light it emits. The projected cross 20 is visible to the operator by the naked eye for safety purposes. The video cameras 12A, 12B are miniature CCD units providing the required resolution in a small package. The optical axes of the light source 10 and cameras 12A and 12B are arranged to be on the same line in the welding direction, but with their angles of viewing offset by a fixed amount, typically 15–30°. This triangulation angle again ensures that the position of the image of the light source is a function of the height of the cameras above the weld joint as well as its lateral position. The light source, optics and video cameras are preferably mounted in a ruggedised enclosure 18 providing suitable protection against the various hazardous influences of the welding environment. The light received into the sensor unit 18 is directed onto the beam splitter 42, which allows approximately half of the received light to pass through towards the first video camera 12A and half the light to be reflected towards a second video camera 12B. The half which passes through the beam splitter 42 is then passed through the dark shaded welding filter 46 which blocks out most of the arc light. This may be a welding filter with a fixed shade or, preferably, it may be an auto-darkening filter which adjusts its shade value automatically dependent on the arc brightness. The remaining light is then imaged by the first video camera 12A. The half of the received light which is reflected by the beam splitter 42 is passed through the narrow band optical filter 44 which only allows light of the laser frequency to pass through. This is then imaged by the second video camera 12B.

The arrangement of the two video cameras 12A, 12B must be such that they receive the same view of the weld. This is conveniently achieved by an initial adjustment and calibration phase which ensures that both cameras are similarly aligned to a common optical axis 48, via the beam splitter 42, with similar optical setups. Although the readouts of the two video cameras should be synchronised for convenient combination, the two cameras may use different exposure times. An alternative arrangement of the open arc sensor unit uses a single camera lens to image the view onto the beam splitter. The two output faces of the beam splitter are then directly coupled to the respective filters. The back side of the filters are then directly coupled to CCD image devices. By suitable setup procedures, this arrangement ensures perfect alignment of the two images.

The sensor control unit 30 again provides three main functions. It provides a variable power supply to the light source (control 38) enabling the brightness of the light source to be adjusted for optimum operator viewing. It mixes the signals from the two video cameras to produce a combined video image (video processing board 34). It also provides the means whereby the operator can superimpose the visible reference mark 20 on the combined video image. This may again be in the form of a horizontal line or a cross hair on the image. The reference mark 20 can be superimposed as a white line or cross, a black line or cross, or as an inverse video line or cross, where the line or cross at any point is white or black depending on the brightness of the underlying image at that point. To perform this function, the sensor control unit must again have an operator interface and a video processing capability. The operator interface provides means 42, for example by the use of up, down pushbuttons, for the operator to move the reference mark 20 until it is in the correct reference position. The video processing function receives the two video signals from the cameras 12A, 122 in the sensor unit 18, first mixes the two signals together and then modifies the combined signal as necessary to insert the reference mark 20 in the desired position.

The method of mixing the two video signals depends on the brightness of the image of the weld joint in the first video camera 12A. If the image is not bright in the area where the light source image occurs 24, then the two video signals can simply be added together. More commonly, if the image of the welding area received by the first camera 12A is mostly bright, then the image of the second video camera 12B is first thresholded to extract only the bright parts of that image. This will largely be restricted to the image of the light source 24. The part of this image which is above the threshold is then superimposed on the first image, for example, by inverting it to produce an image of the reference light source 24 which is clearly visible when overlaid onto the first image. This operation and the decision as to how the image of the reference light source on the second camera is superimposed on the first image is preferably performed automatically and dynamically. This handles the situation where the first image is dark before welding begins and bright afterwards.

The combined video signal is then displayed conveniently on the video monitor 22 enabling the operator to clearly observe the position of the light source image 24 relative to the reference mark 20 an the weld joint 26 in the same way as was described for submerged arc welding.

Setup and operation of the system for open arc welding is basically the same as was described above for submerged arc welding.

In both the submerged arc and open arc cases, the fixed angular relationship between the laser cross and the camera can additionally be used to make accurate dimensional measurements of the weld joint (or of any object in the field of view). In welding applications, it is particularly useful to be able to make accurate linear measurements and accurate area measurements.

To provide measurement facility, the sensor control unit is augmented by additional operator buttons additional functions on the video processing board.

There are many different ways of designating additional operator pushbuttons to provide the measurement function.

One simple way is to add three buttons marked:
distance
area
clear.

To measure a distance in the image, the operator must first ensure that the two points whose distance apart is to be measured are both on the horizontal part of the laser cross 24. For example, this might be the two edges of a weld joint. The operator then uses the video crosshair adjustment 30 to move the crosshair 40 to the location (on the laser cross 24) of the first point of interest. When the video crosshair 20 is at the first point, the operator presses the "distance" button. This causes a measured distance (initially 0.0) to be shown as text overlayed on the video image. Now as the operator moves the video crosshair 20, preferably keeping the crosshair on the horizontal part of the laser cross 24, the display is continuously updated to show the actual physical distance between the initial point and the current point of the crosshair. So, for example, to measure the width of a weld joint, the operator can first ensure that the horizontal part of the laser cross 24 spans the joint. Then he moves the video crosshair 20 until it is on the laser cross 24 and on the first point on one side of the joint, and presses the "distance" button. The operator then moves the video crosshair 20 to the other side of the weld joint and is able to read the actual physical width of the joint off the screen.

A similar capability to measure areas, such as weld joint cross-sectional areas, can be provided by using the video crosshair 20 to select a series of points all on the horizontal part of the laser cross and 24 forming a closed contour when joined by a series of imaginary straight lines.

To provide these measurement functions, the video processing electronics must be augmented with the following additional functions:

1. An interface to recognise when the extra pushbuttons, e.g. "distance" or "area", have been pushed.
2. Calibration functions to convert from image coordinates to world coordinates. Such functions are well known to those skilled in the art.
3. Mathematical functions to compute distance or areas from pairs or set of points respectively. Such functions are also well known to those skilled in the art.
4. A display function for superimposing alphanumeric text on the video display.

The advantages of the invention and the ways in which the disadvantages of previously known arrangements are overcome, include:

The ability of the operator to tell at a glance from the picture on the video monitor whether or not the welding electrode is in the correct position relative to the weld joint in both the horizontal and vertical dimensions. This is an advance over the prior art in which the operator was only able to see horizontal errors.

The provision of visual feedback which the operator can use to control the horizontal and vertical position of the electrode before starting to weld and throughout the welding operation.

The ability of the operator to move and set the image reference mark allowing a reference height to be set conveniently which may be easily adjusted for different part shapes and for different welding parameters, such as electrode stickout.

The provision of the horizontal and vertical sensing capability within a single ruggedised sensor unit which is easily mounted to the welding head.

The provision of lateral and height information remotely from the welding head.

The ability of the operator to make accurate dimensional measurements of the weld joint remotely by simply pressing a few buttons.

In submerged arc welding, the difficulty for an operator in accurately estimating the relative position of the electrode to the weld joint results from the coverage of the electrode and the joint by the powder flux which is essential to the welding process. Attempts to eliminate this have used a light source and direct observation or a video camera to improve the estimation of lateral position. The method described above is a further improvement by allowing clear observation of both the lateral and height position of the electrode relative to the weld joint. The improvement has resulted from the use of a light source and video camera in a fixed relationship to each other and the welding electrode, and the use of an adjustable reference mark on the video image.

In open welding, the problem has been compounded by the difficulty of using an additional light source because the additional light source is not visible in the vicinity of the arc. These problems have been solved by the use of a coherent light source of basically a single frequency to provide a reference in fixed relationship to a pair of video cameras and to the welding electrode. Both video cameras are arranged to have essentially the same view of the weld. One camera views through a welding filter, the other camera views through a narrow band filter which only passes through light of the same frequency as the coherent light source. The two video signals are then combined to produce a single image on which the reference light source is shown in its correct position relative to the weld joint. Again, by reference to an adjustable reference mark superimposed on the combined video a signal, the operator is provided with an easy way of immediately determining the lateral and height relationship of the welding electrode to the weld joint.

Improvements and modifications may be incorporated without departing from the scope of the invention as is defined in the claims appended hereto.

I claim:

1. Arc welding control apparatus comprising:
    sensor means including a light source for projecting a first visible reference mark along a first optical axis onto the line of a weld being formed in a work-piece and a video imaging means arranged to view said work piece along a second optical axis for generating a video signal representing an image including said first reference mark, said sensor means being adapted to be mounted on or adjacent to the welding torch of arc welding apparatus for horizontal and vertical movement with said welding torch, said first and second optical axes being disposed at an angle to one another so as to intersect at a predetermined point relative to said video imaging means;
    sensor control means for receiving said video signal from said video imaging means, including video processing means for generating a second video signal representing a second reference mark and for combining said first and second video signals to generate a third, composite video signal representing said image including said first reference mark with an image of said second reference mark superimposed therein, and further including means for adjusting the position of said second reference mark within the frame of said image including said first reference mark.

2. Apparatus as claimed in claim 1, wherein said means for adjusting the position of said second reference mark comprises manually operable means.

3. Apparatus as claimed in claim 1, wherein said sensor means further includes means for controlling the operation of said light source.

4. Apparatus as claimed in claim 1, wherein:

said sensor means includes second video imaging means for generating a fourth video signal and beam splitter means, said first and second imaging means and said beam splitter means being arranged such that both imaging means view said work piece along said second optical axis, narrow band optical filter means disposed in front of said second imaging means and dark shaded welding filter means disposed in front of said first imaging means, said light source being a narrow band light source matching said narrow band optical filter; and wherein said video processing means is adapted to combine said fourth video signal with said first and second video signals so as to generate said third, composite video signal.

5. Apparatus as claimed in claim 1, wherein said angle between said first and second optical axes is in the range 15° to 30°.

6. Apparatus as claimed in claim 1, wherein said light source is a laser source.

7. Apparatus as claimed in claim 1, wherein the components of said sensor means are enclosed in a ruggedised enclosure.

8. Apparatus as claimed in claim 1, further including video monitor means for receiving said third, composite video signal and for displaying the image represented thereby.

9. Apparatus as claimed in claim 1, further including means for calculating the distance between at least two points in the area imaged by said video imaging means, said points being selected by adjustment of the position of said second reference mark.

10. Apparatus as claimed in claim 9, further including means for calculating an area bounded by at least three points in the area imaged by said video imaging means.

11. Arc welding apparatus including a welding torch adapted for vertical and horizontal movement and having a welding electrode, in combination with arc welding control apparatus as defined in claim 1, wherein said sensor means is mounted on or adjacent to said welding torch for movement therewith.

12. A method of controlling an arc welding process for forming a weld along a predetermined line using arc welding apparatus including a welding torch adapted for vertical and horizontal movement and having a welding electrode, comprising the steps of:

prior to commencing welding, adjusting the initial position of the welding torch such that the welding electrode is in a required position relative to a work piece;

projecting a first visible reference mark along a first optical axis onto the line of the weld ahead of the welding torch in the direction of welding;

arranging video imaging means to view said work piece along a second optical axis and generating a video signal representing an image including said first reference mark, said first and second optical axes being disposed at an angle to one another so as to intersect at a predetermined point relative to said video imaging means;

generating a second video signal representing a second reference mark;

combining said first and second video signals to generate a third, composite video signal representing said image including said first reference mark with an image of said second reference mark superimposed therein, the position of said second reference mark being adjustable within the frame of said image including said first reference mark;

adjusting the location of said second reference mark within said image frame while maintaining the welding torch in said initial position such that the first and second reference marks are aligned with one another;

commencing the welding process; and monitoring the position of said second reference mark relative to said first reference mark during the progress of the welding process and adjusting the position of said welding torch so as to maintain said first and second reference marks in alignment with one another.

* * * * *